Patented Feb. 1, 1949

2,460,748

UNITED STATES PATENT OFFICE 2,460,748

AUTOMATIC TEMPERATURE CONTROL APPARATUS

Donald S. Hersey, East Hartford, and Arthur A. Brown, Manchester, Conn., assignors to United Aircraft Corporation, East Hartford, Conn., a corporation of Delaware Application September 14, 1944, Serial No. 554,126

2 Claims. (Cl. 236—74)

This invention relates to an automatic control of a variable with the object of holding the variable close to a predetermined value. More particularly this invention is described in relation to an automatic temperature control for an internal combustion engine, which is often subject to rapid changes in heat transfer conditions, especially on aircraft. The difficulty of the problem arises mainly from the lag which occurs between a change in the variable and the application of the corrective measure, since some change in the variable must occur before any corrective measure can be taken. As a result of such lag, by the time the corrective measure is applied, the variable may have passed beyond desirable limits and thus over correction is necessary first in one direction and then the other. Thus "hunting" is set up, that is, oscillation of the variable (in this case, the engine cylinder temperature) between values outside the desired close limits of control.

It is, therefore, one of the principal objects of this invention to provide an automatic control for a variable such as engine cylinder temperature, which will maintain the variable within the desired close limits of control. For this purpose there is provided an element designed to anticipate variations in the variable (in this case, the engine cylinder temperature) and energize means which will introduce a correction before an appreciable change has occurred.

The problem of automatic control of a variable with the object of holding the variable close to a predetermined value is further complicated by the lag which occurs between the application of the corrective measure and the taking effect of such measure. Thus in aircraft engines where the cooling air flow is controlled in accordance with engine temperature, there is a lag between the time that the amount of air supplied to the engine is varied and the taking effect of such changed air supply on the engine. This also tends toward overcorrection. It is therefore a further object of this invention to provide an element which will respond to the corrective measure sooner than the variable to be controlled (in this case the engine temperature) and thus anticipate the response of the variable. In this manner, this source of overcorrection, and consequent hunting or oscillation of the corrective means, is substantially reduced.

Still another difficulty which has heretofore prevented holding a variable close to a predetermined value, has been the fact that the degree of corrective measure has been a function not of the degree of variation of the variable but of the duration of such variation. Thus a relatively small variation continuing for an appreciable time will introduce a large degree of correction so that when the variation ceases, the maximum corrective measure is being applied. This also tended toward overcorrection with consequent hunting and oscillation of the corrective device. It is therefore another object of this invention to provide, in combination with the anticipatory element hereinbefore described, a follow-up mechanism which will reduce the degree of correction as a function of the duration of the variable and thus prevent the application of an overcorrection.

Further objects and advantages of this invention will become apparent in the following detailed description thereof.

In the accompanying drawings.

While this invention is described hereinafter in connection with the control of the temperature of an aircraft engine cylinder, it will become apparent that it has general application to the control of other variables than engine cylinder temperature.

In aircraft engines it is desirable to control the engine cylinder operating temperature to prevent damage by excessive cylinder temperatures. The control of the cylinder temperature may be effected by controlling the air (or other cooling fluid) passing thereover. In the case of aircraft engines this control may consist of adjustable flaps controlling the air inlet or air outlet of the passage surrounding the engine between the engine and the cowl or nacelle, to allow more or less cooling air to pass therethrough; or the control may consist in varying the amount of air supplied to the engine by a cooling fan. The air flow controlling means was heretofore controlled from a temperature-sensitive device responsive to engine temperature at a critical point, in other words, at a point on the engine likely to be damaged by excessive engine temperature. This point is often in the cylinder head at the position of the rear spark-plug.

Figure 1:
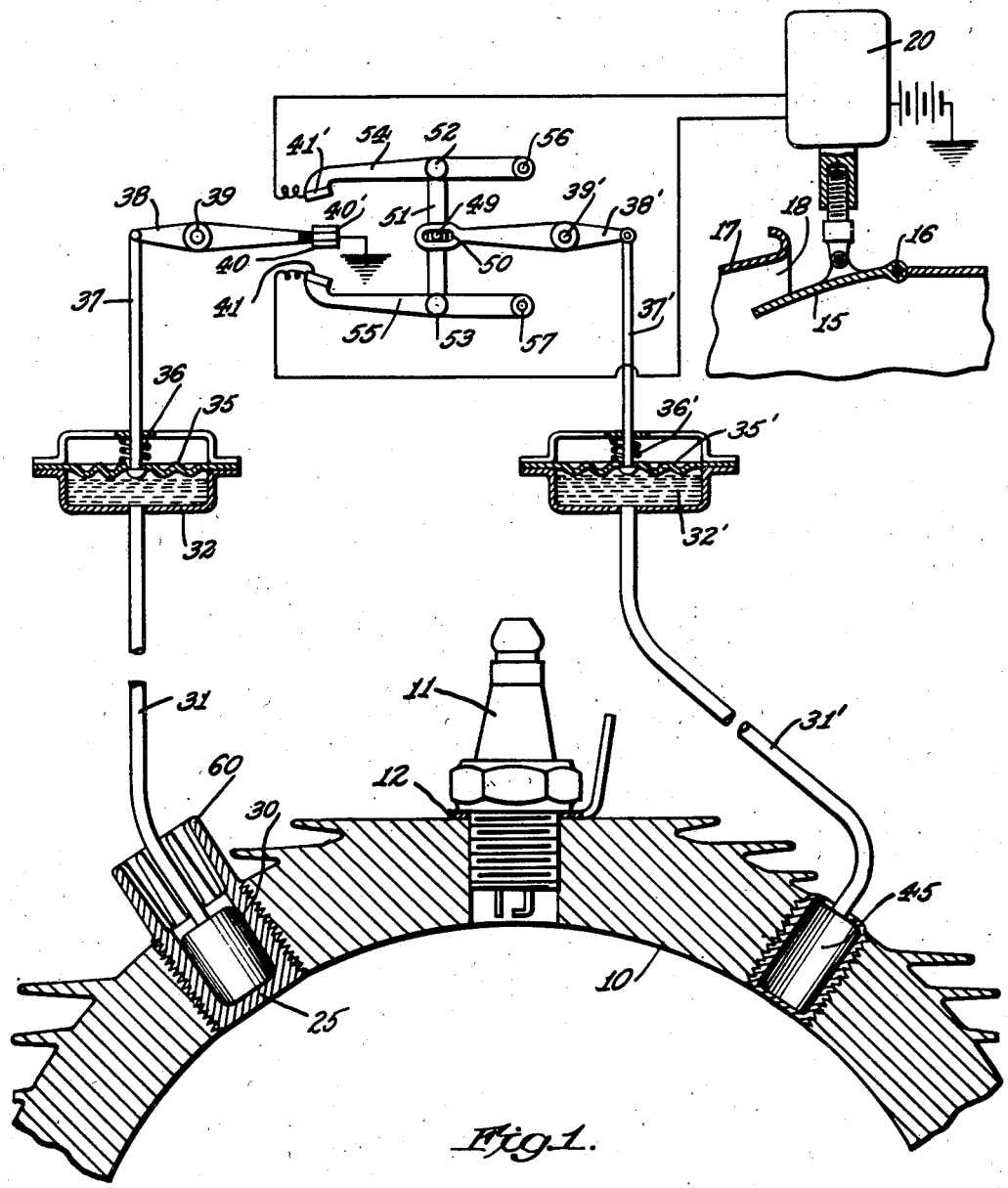
Fig. 1 is in part a diagrammatic assembly, and in part a section through the cylinder head of an engine, showing one form of this invention.

Referring to Fig. 1 there is shown an engine cylinder head 10 having a rear spark-plug 11 and a thermally responsive element 12 positioned between the head and the spark-plug. In accordance with the temperature of the engine it has heretofore been customary to control the air flow to the engine, as for instance by controlling flaps 15 pivoted at 16 in such manner that said flaps in conjunction with the cowl 17 may control an opening 18 which may be either an air inlet or an air outlet passage. In either case the size of opening 18 will determine the amount of air passing through the cowl 17 and hence the amount of air which will be available for cooling the engine. Heretofore, means have been provided whereby a thermally responsive element controlled means, such as a gear reduction motor 20 having gear connection to the flaps 15, so that when the temperature of the engine increased above a predetermined normal, the opening 18 was increased to increase the flow of air, and when the temperature fell below normal the opening 18 was decreased to decrease the flow of air. The difficulty with this system was that before the thermally responsive element could effect a change in flow of cooling fluid, the cylinder head temperature had already experienced an appreciable change; and before the thermal element could correct this change, the temperature of the cylinder head frequently exceeded its desired limit. As a result the corrective device introduced an overcorrection which caused the engine temperature to vary too far in the opposite direction, thus necessitating another correction in the reverse direction. Thus unstable oscillation or hunting of the corrective device was set up.

To prevent such oscillation or hunting, there is provided by this invention an anticipating element which responds to change in temperature in the cylinder head faster than the thermally responsive element 12, and in fact faster than the cylinder head itself. This element consists of a special alloy plug positioned in the cylinder head near the point where the reference temperature is normally taken, that is near the position of the rear spark-plug. This element may comprise a plug 25 threaded through the wall of the cylinder head at a point adjacent the rear spark-plug 11, the said plug being formed of a material such as copper, silver or any special alloy of greater thermal conductivity, or lower specific heat, or both greater conductivity and lower specific heat than the material of the cylinder wall. Thus the special plug will respond to thermal current, and, hence, to changes in temperature within the engine cylinder faster than the material of the cylinder wall and head and thus, in a sense, anticipate the change in temperature which will take place in the cylinder head. This anticipating element may contain therein a bulb 30 or other thermally responsive unit, also of material of high thermal conductivity, or low specific heat, or both high conductivity and low specific heat, said bulb being filled with fluid and communicating with a fluid conduit 31 connecting to a reservoir 32. The reservoir 32, conduit 31 and bulb 30 form a system filled with fluid. The upper end of the reservoir is formed by a diaphragm 35 normally spring pressed downwardly into engagement with the fluid by a spring 36. Expansion or contraction of the fluid in the closed system will cause the diaphragm 35 to move in one direction or the other to operate link 37 connected to the diaphragm and move lever 38 around its pivot 39 to cause contact 40 to engage contact 41 or cause contact 40' to engage contact 41', in accordance with the direction of movement of the diaphragm. Engagement of contacts 40 and 41 will energize motor 20 in one direction while engagement of contacts 40' and 41' will energize motor 20 in the opposite direction. The wiring is such that a rise in temperature of the plug 25 will cause the motor 20 to operate in a direction to increase opening 18, while a drop in temperature of plug 25 will cause motor 20 to operate in a direction to decrease opening 18.

Once a pair of contacts 40, 41, or 40', 41' is closed, it is obvious that the motor 20 would continue to operate to increase the amount of correction supplied until the contacts opened at this point. When the temperature of the cylinder head has been corrected, the motor 20 has been actuated to a position where the maximum correction is being applied through the opening 18. This results in an overcorrection of the temperature, which will cause the opposite set of contacts to close and reverse the motor 20 to effect a correction in the opposite direction. The same situation will exist at the end of this latter correction, namely that the maximum correction is being applied when there is no longer need for any further correction. Thus oscillation or hunting is set up. To obviate such hunting or oscillation, there is provided a follow-up, which may take the form shown in Fig. 1 of a more slowly acting temperature responsive element 45 in the form of a plug set into the cylinder head near the spark-plug 11. This plug, however, is of a material having a thermal conductivity and specific heat approximating that of the cylinder head material, and therefore will respond to changes in temperature more slowly than the plug 25. A bulb similar to bulb 30 is provided within plug 45 and said bulb is connected by conduit 31' to a reservoir 32', the reservoir conduit and bulb forming a closed system filled with fluid. The upper wall of reservoir 32' is closed by a diaphragm 35' spring pressed downwardly by spring 36' and having a link 37' connected at the end of a lever 38' pivoted at 39'. The other end of lever 38' has a pin and slot connection 49, 50 with a link 51 pivoted at 52 and 53 to links 54 and 55 respectively, the latter links being pivoted on fixed pivots 56 and 57. Links 54 and 55 carry the contacts 41' and 41 respectively.

The follow-up mechanism described above operates as follows: Assume that the temperature of the cylinder head has risen and lever 38 has been rotated clockwise to close contacts 40 and 41 and energize motor 20 to enlarge the opening 18 and thus permit more air to flow to the engine. After the corrective measure has been set in operation, plug 45 will respond to the increased temperature to move lever 38' counter-clockwise, thus moving link 51 downwardly and moving link 55 and contact 41 downwardly, away from contact 40 in a direction to break the circuit through motor 20. Thus the amount of correction induced by motor 20 is limited by the follow-up. If the flow correction was sufficient to prevent further rise in temperature of the cylinder head, then no further contact will be made between contacts 40 and 41. However, if the amount of correction introduced is not sufficient and the temperature continues to rise, lever 38 will be rotated further in a clockwise direction until contacts 40 and 41 again make contact to energize motor 20 to introduce more correction. The follow-up will again limit the amount of correction introduced. This will continue step by step until the proper correction has been introduced for preventing further increase in temperature of the cylinder head. At each step the correction is cut off instead of, as heretofore, the corrective device being at its point of maximum operation when the increase in temperature has been overcome. Thus overcorrection, and hence hunting and oscillation, is substantially reduced.

When opening 18 has been increased or decreased as the case may be to provide more or less air to lower or raise the engine temperature, there is a certain lag which occurs between the time that the correction is applied and the time that the correction takes effect on the engine cylinder. This also has a tendency to result in overcorrection. To obviate this condition the plug 25 is formed with fins or spines 60 extending outwardly from the engine wall into the air stream. The fins 60 are also of material of greater thermal conductivity, lower specific heat, or both greater conductivity and lower specific heat than the material of the cylinder wall, and by reason of such material and its positioning in the air stream, will respond to the corrective action of the increased or decreased air flow sooner than the engine cylinder. Thus, it will anticipate the effect of the corrective measure and, by controlling the motor 20, will prevent overcorrection.

Figure 2:
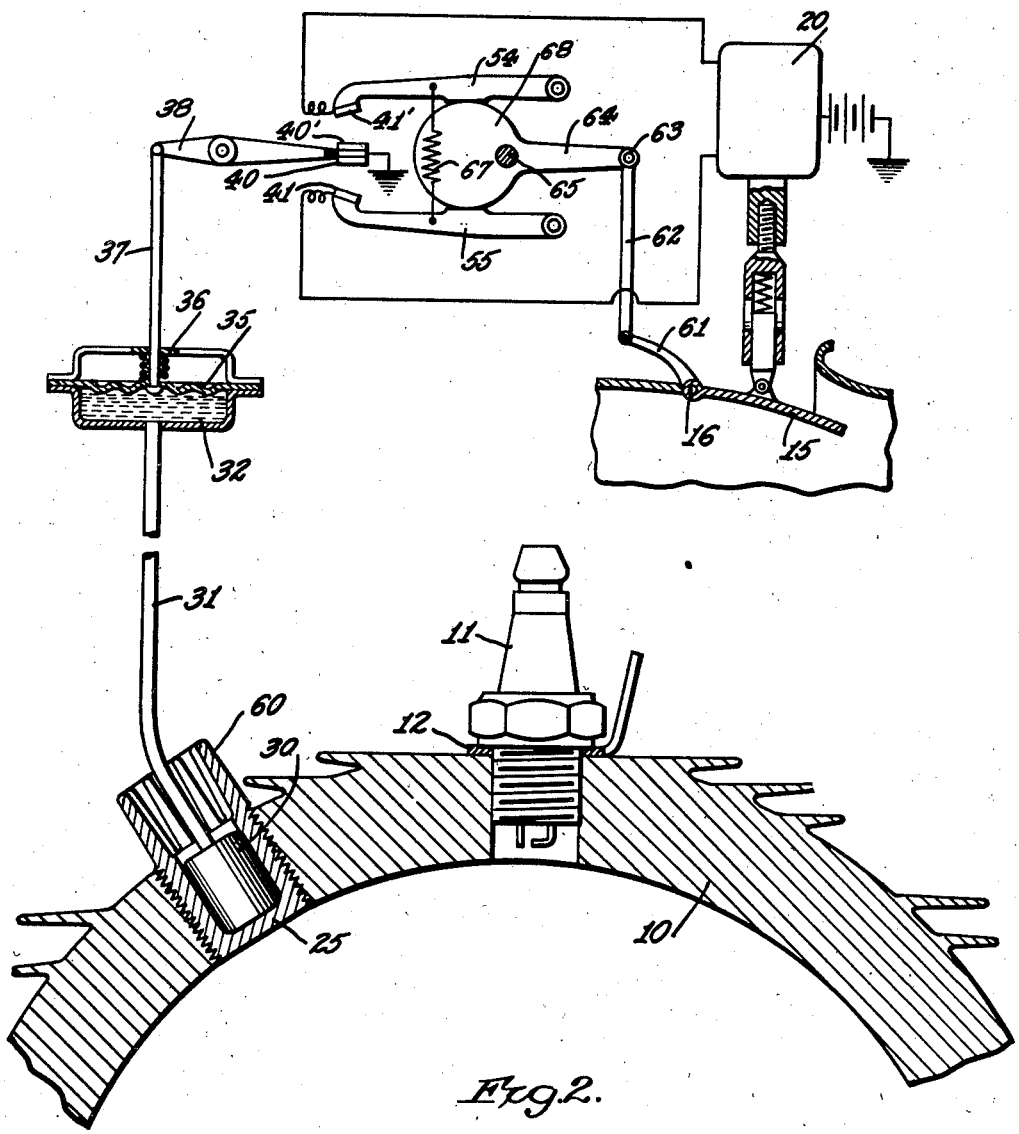
Fig. 2 is a view similar to Fig. 1 showing another form of this invention.

In the Fig. 2 form of the invention there is disclosed a different type of follow-up. In place of the bulb 45 and the fluid system and linkage actuated thereby, the follow-up may be operated from the corrective device itself, that is from the follow-up motor 20. In this case, as the motor operates to actuate the flaps 15 in one direction or the other around the pivots 16, an arm 61 movable integrally with the flaps 15 may actuate a link 62 pivoted at 63 to the end of a lever 64 which is pivoted at 65. The other end of lever 64 may take the form of an eccentric 66 which engages the links 54 and 55. The links are held in engagement with the eccentric by means such as spring 67 and will follow the movements of the eccentric as lever 64 is rotated around its pivot 65. In this manner, as the flaps 15 are actuated the links 54 and 55 are moved in one direction or the other to cause contact 41 or 41' to break contact with the respective contact 40 or 40'. The action of the follow-up in this form of the invention is otherwise exactly the same as in Fig. 1 form.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. Apparatus for controlling the temperature of a given means, comprising a first temperature-responsive means constructed and arranged to be sensitively responsive to the temperature of said given means, a second temperature-responsive means constructed and arranged to be relatively more slowly responsive to the temperature of said given means than said first temperature-responsive means, an arm arranged to be moved in a predetermined path in response to said first temperature-responsive means and connected to be moved in said path so that its position is a function of the temperature to which said first temperature-responsive means is exposed, an independently movable yoke means cooperating with said arm and having arms adapted to be selectively engaged by said arm upon the occurrence of a change of the temperature of said first temperature-responsive means, means responsive to said second temperature-responsive means for moving said yoke means in a direction such as to cause the disengagement of one of said yoke arms with the first named arm following such engagement incident to a change in the temperature of said given means, reversible actuating means for controllably varying the flow of a temperature-affecting fluid which directly influences the temperature of said given means, and an electric circuit for controlling the operation of said reversible actuating means to cause it to operate to vary the flow of said temperature-affecting fluid in a corrective direction respectively upon and during contact between said first named arm and one of the arms of said yoke means.

2. Apparatus for controlling the temperature of a given means in accordance with claim 1, wherein said given means is a solid body onto which said temperature-affecting fluid impinges to influence the temperature of said solid body, and wherein said first temperature-responsive means comprises a plug portion composed of material of higher thermal conductivity than the material of which said solid body is composed, said first temperature-responsive means further having a plurality of fins extending outwardly from said solid body and directly exposed to said temperature-affecting fluid impinging on said solid body, whereby said first temperature-responsive means is influenced in part by the temperature of said solid body and in part by the temperature of said temperature-affecting fluid.

DONALD S. HERSEY.
ARTHUR A. BROWN.

REFERENCES CITED

The following references are of record in the file of this patent:

UNITED STATES PATENTS

| Number | Name | Date |
| --- | --- | --- |
| 1,043,344 | Newman | Nov. 5, 1912 |
| 1,782,045 | Mason | Nov. 18, 1930 |
| 1,854,072 | Schlaich | Apr. 12, 1932 |
| 1,925,352 | Twombly | Sept. 5, 1933 |
| 1,994,983 | De Florez et al. | Mar. 19, 1935 |
| 2,081,762 | Nissen | May 25, 1937 |
| 2,261,343 | De Florez et al. | Nov. 4, 1941 |
| 2,333,066 | Yieda | Oct. 26, 1943 |
| 2,344,535 | Clark | Mar. 21, 1944 |

FOREIGN PATENTS

| Number | Country | Date |
| --- | --- | --- |
| 538,182 | Great Britain | July 24, 1941 |